United States Patent
Brierley

(10) Patent No.: US 6,172,534 B1
(45) Date of Patent: Jan. 9, 2001

(54) GAIN CONTROL ARRANGEMENT AND METHOD

(75) Inventor: Paul Andrew Brierley, Bolton (GB)

(73) Assignee: LSI Logistics Company, Milpitas, CA (US)

( * ) Notice: Under 35 U.S.C. 154(b), the term of this patent shall be extended for 0 days.

(21) Appl. No.: 09/257,418

(22) Filed: Feb. 25, 1999

(30) Foreign Application Priority Data

Feb. 26, 1998 (GB) .................................................. 9804167

(51) Int. Cl.[7] .................................................. H03K 5/153
(52) U.S. Cl. .................................................. 327/58; 327/77
(58) Field of Search ................................ 327/58, 62, 77, 327/363, 514, 560, 561, 562, 563

(56) References Cited

U.S. PATENT DOCUMENTS

| | | | |
|---|---|---|---|
| 3,750,036 | * 7/1973 | Burrows et al. | 327/77 |
| 3,979,670 | * 9/1976 | Vahaviolos | 327/58 |
| 4,475,398 | * 10/1984 | Tjornehoj | 73/599 |
| 4,638,384 | * 1/1987 | Stewart et al. | 360/77.05 |
| 5,438,460 | 8/1995 | Coker et al. | 360/46 |

* cited by examiner

Primary Examiner—Kenneth B. Wells
Assistant Examiner—Paul Dinh
(74) Attorney, Agent, or Firm—Christopher P. Maiorana, P.C.

(57) ABSTRACT

A gain control arrangement is suitable for controlling the gain of a variable gain amplifier in dependence on the difference between the actual magnitude and the desired magnitude of a read signal provided over an optical data carrier read channel. The amplitude of the read signal is sampled at periodic sampling points to determine an envelope value based on the sample value at a sampling point and an envelope value at a preceding sampling point, and a gain error value is derived from the difference between that envelope value and a desired envelope value.

14 Claims, 2 Drawing Sheets

GAIN CONTROL ARRANGEMENT AND METHOD

BACKGROUND OF THE INVENTION

The present invention relates to a gain control arrangement and to a method for controlling the gain of a variable gain amplifier in dependence on the difference between the actual magnitude and the desired magnitude of a read signal provided over an optical data carrier read channel.

To recover data from optical data carriers, it is known to class the write/read channel of the data carrier in accordance with a partial response characteristic which approximates to the frequency response characteristics of the channel, and the arrangement or design of a digital data recovery circuit is selected to optimise data recovery from a channel with that partial response characteristic.

If the signal from the head assembly is to be equalised to more closely assume the partial response class, the choice of whether an analogue or digital equalising filter is used depends on whether it is desired to position the filter before or after the flash analogue-to-digital convertor (ADC) used for sampling the read signal in the read path. Typical partial response (PR) characteristics are PR(a, b, a), where a and b are constants in the overall equalised channel impulse response of $a+bD+aD^2$, and PR(a, b, b, a), where a and b are constants in the overall equalised channel impulse response of $a+bD+bD^2+aD^3$. Here, D represents a unit delay operator.

The impulse response in combination with an appropriate coding scheme, such as for example 8, 16 efm+ or 1, 7 RLL, gives rise to a final stream of digital waveform samples which have a limited set of ideal values. For PR(a, b, a) channels there are four such levels whereas for PR(a, b, b, a) channels there are five. In optimally recovering data from channels of these and other types, the read signal is often operated on to be centred on an ADC code of zero, as the use of 2's complement digital schemes for data recovery is often preferred over other schemes. Following this centring, the read signal should be operated on by an automatic gain control (AGC) device which appropriately scales the amplitude of the read signal to allow optimum data recovery to be performed by way of a data slicer in the following data recovery circuit.

Increasing mismatch between the actual scale of amplitude and the desired scale of amplitude of the input read signal increases the probability of incorrectly decoding data. Conventional AGC devices used with partial response channels become operative only when a phase locked loop of the data recovery circuit has locked onto the frequency of the components of interest of the read signal. Once lock has occurred, the AGC device compares the digital amplitude value of the sampled read signal with the ideal amplitude value provided by the data slicer. The difference value obtained either is provided as a gain error value, or multiplied by an amount dependent on the ideal value provided by the data slicer, to provide a gain error value. Error values are accumulated over a number of sampling periods to generate a feedback error value which controls the gain of a variable gain amplifier (VGA) within the closed-loop AGC system to scale the amplitude of the read signal.

However, such conventional systems can suffer drawbacks in that any phase or frequency errors in the phase locked loop will result in erroneous gain error values. As the feedback error value will be erroneous as a result of this, correct gain adjustment, or gain lock, of the VGA may not occur, or occur only after many sample clock cycles. Also, such a system cannot be used for initial adjustment of the VGA gain necessary to take the read signal to a magnitude which is suitable for timing recovery by the phase locked loop to occur.

Furthermore, such a conventional AGC system can only produce meaningful gain error values when the actual magnitude of the amplitude of the read signal is close enough to the ideal amplitude magnitude that there are sufficiently few decision errors in the data slicer output to ensure correct phase and frequency lock. The gain need only be a few tens of percent below the ideal gain for gain lock to be unobtainable in, for example, PR(a, b, a) channel data recovery circuits.

SUMMARY OF THE INVENTION

In accordance with a first aspect of the present invention, there is provided a gain control arrangement, for controlling the gain of a variable gain amplifier in dependence on the difference between the actual magnitude and the desired magnitude of a read signal provided over an optical data carrier read channel, comprising:

means to sample the amplitude of the read signal at periodic sampling points to provide a sample value for each sampling point;

means to determine an envelope value having regard to the sample value at a sampling point and an envelope value determined at a preceding sampling point; and means to determine a difference value corresponding to the difference between the envelope value and a desired envelope value, thereby providing a gain error value.

The envelope value determining means may comprise means to compare the sample value at a sampling point with an envelope value determined at a preceding sampling point; and means responsive to the comparison means to provide the larger of the compared values as the envelope value. Alternatively or in addition, the arrangement may further comprise means to subtract a predetermined value from the envelope value at a preceding sampling point to provide a decremented envelope value. If these features are present, the arrangement may further comprise means responsive when the comparison means shows the sample value to be lower than the envelope value at the preceding sampling point to provide the decremented envelope value as the envelope value.

Advantageously, the arrangement further comprises register means to provide the envelope value of a preceding sampling point from the envelope values and from a clock signal having a frequency equal to a frequency of the sampling points. The envelope determining means may further comprise rectifying means to provide the modulus of the sample value to the compare means.

Preferably, the variable gain amplifier is controlled to amplify an input signal by an amount dependent on at least one gain error value to provide the read signal.

In accordance with a second aspect of the present invention, a method of controlling the gain of a variable gain amplifier in dependence on the difference between the actual magnitude and the desired magnitude of a read signal provided over an optical data carrier read channel, comprises:

sampling the amplitude of the read signal at periodic sampling points to provide a sample value for each sampling point;

determining an envelope value with regard to the sample value at a sampling point and an envelope value determined at a preceding sampling point; and determining a difference value corresponding to the difference between the envelope value and a desired envelope value, to thereby provide a gain error value.

The method may further comprise comparing the sample value at a sampling point with an envelope value determined at a preceding point; and providing the largest of the compared values as the envelope value. Alternatively or in addition, the method may further comprise the step of subtracting a predetermined value from the envelope value at a preceding sampling point to provide a decremented envelope value. If these steps are present, the method may further comprise the step of providing, when the comparing step shows the sample value to be lower than the envelope value at the preceding sampling point, the decremented envelope value as the envelope value.

The method may further comprise the step of delaying the envelope values by one clock period of a clock signal having a frequency equal to a frequency of the sampling points to provide the envelope value of a preceding sampling point.

The envelope determining step may further comprise rectifying the sample value to provide the modulus thereof for use in the comparing step. Preferably, the method further comprises the step of controlling the gain of the variable gain amplifier to amplify an input signal by an amount dependent on at least one gain error value to provide the read signal.

BRIEF DESCRIPTION OF THE DRAWINGS

An embodiment of the present invention will now be described with reference to the accompanying drawings, of which.

DETAILED DESCRIPTION OF THE PREFERRED EMBODIMENTS

Figure 1:
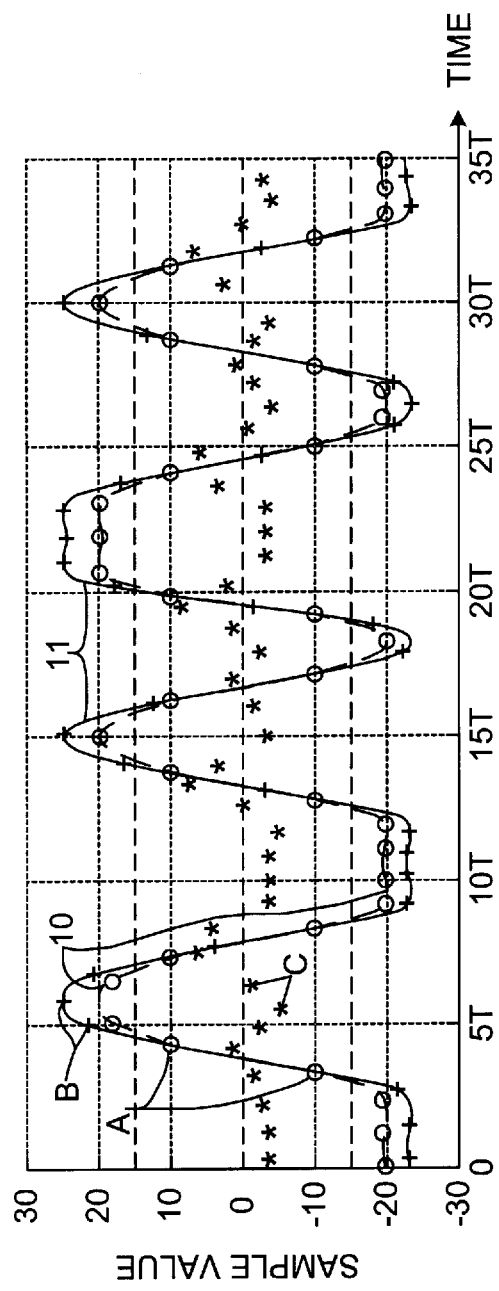
FIG. 1 shows gain error values provided by a prior art automatic gain control arrangement in respect of a read signal.

Referring to FIG. 1, an ideal read signal 10 of ideal amplitude magnitude is shown with sampling points marked thereon as circles A. The sampling points are of the correct phase, with regard to the components of interest of the read signal 10, for a data recovery circuit arranged to recover data received over a PR(a, b, a) class of channel. The sampling points A are defined by a clock signal having a period of T seconds and are in phase and frequency alignment with the components of interest of the read signal 10. Overlaid is a signal 11 which has an amplitude magnitude 20% larger than the ideal amplitude magnitude and which is sampled at points, marked by crosses B, defined by a sampling clock cycle having a period which is 13% smaller than the period of the components of interest of the read signal 11. The signal 11 and its sampling points therefore are representative of the case where a phase-locked loop, an output of which the period of the clock signal is derived from, has not attained correct phase and frequency lock. Although the gain error value provided by the prior art automatic gain control device described above at each sampling point, as shown by asterisks C, should be negative, because the gain is too high, it can be seen that there are many gain error values C at sampling points for which this is not the case. A feedback error value generated including such gain error values would clearly be inaccurate. Although not in the case of FIG. 1, a feedback error value provided on the basis of such erroneous gain error values will often not provide any correction of the gain of an AGC device, but instead increase the gain error so that gain lock would not be achieved.

Figure 2:
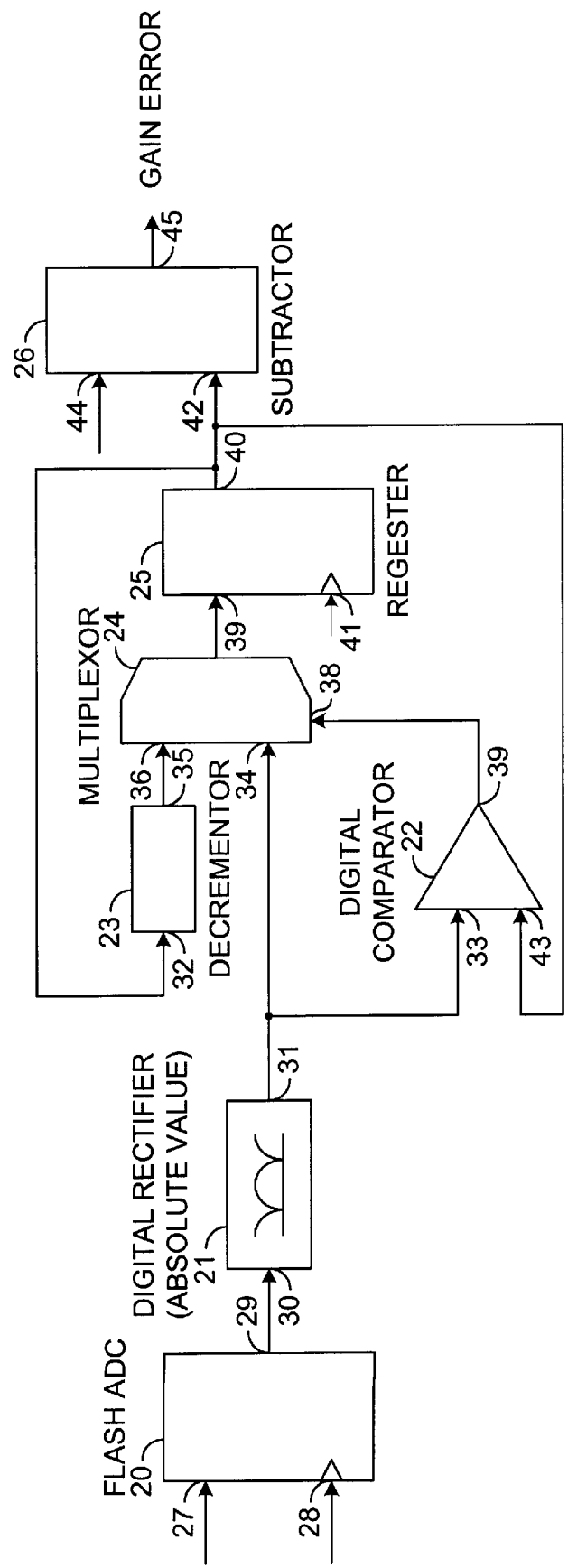
FIG. 2 shows a part of a gain control arrangement in accordance with the present invention.

Referring now to FIG. 2, the gain control arrangement of the present invention comprises generally a flash analogue to digital converter (ADC) 20, a digital rectifier 21, a digital comparator 22, a decrement device 23, a digital multiplexor 24, a register 25 and a digital subtracter 26.

The ADC 20 samples an analogue read signal received at an input terminal 27 at the rising edge of every cycle of a clock signal received at a clock input terminal 28 and provides a digital signal comprising a series of digital values representative of the amplitude of the sampled read signal at respective sampling points on an output 29. The signal provided on the output terminal 29 is centred on an ADC code of zero. The digital rectifier 21 receives this signal at an input terminal 30 and provides the digital modulus of that signal on an output terminal 31. Dependent on the implementation of the automatic gain control arrangement, the rectifier may simply comprise means to detect the sign bit of the sampled signal, leaving the sampled value unchanged if the sign bit is zero (i.e. the sample has a positive value) and inverting all of the bits and adding the value of one to the result otherwise, thereby performing a modulus operation on the terminal 30 signal to provide a rectified digital signal at the terminal 31.

The rectified digital signal is provided from the output terminal 31 to a first input terminal 33 of the comparator 22 and to a first input terminal 34 of the digital multiplexor 24. The decrement device 23 subtracts a predetermined amount, which in this embodiment is preferably equal to one, from an output digital signal of the register 25 received on an input terminal 32 and provides the resulting decremented register output signal on an output terminal 35 to a second input terminal 36 of the digital multiplexor 24.

The digital multiplexor 24 provides on an output terminal 37 a multiplexor output signal which is equal either to the rectified signal received at the terminal 34 or to the decremented register output signal received at the terminal 36, dependent on a logic signal received at a switching input terminal 38 from an output terminal 39 of the comparator 22. This is described in more detail below. The multiplexor output signal from the terminal 37 is received at an input terminal 39 of the register 25, which provides on an output terminal 40 thereof the multiplexor output signal that was provided to it on the immediately preceding clock cycle. The same clock signal as that used by the ADC 20 is received on a clock input terminal 41 to attain this. The register output signal is provided to the input terminal 32 of the decrement device 23 as described above, to a first input terminal 42 of the subtracter 26, and to a second input terminal 43 of the comparator 22.

The arrangement thus far described operates as follows. If the comparator 22 determines that the rectified digital signal is greater than or equal to the register output signal, i.e. the value of the signal present at the terminal 43 is not less than the value of the signal at the terminal 33, the subtracter 22 provides a logical one signal to the switching input 38 of the multiplexor 24 by way of its output terminal 39. In this case, the multiplexor 24 provides the rectified digital signal received at the terminal 34 as the multiplexor output signal on the terminal 37. If the subtracter 22 provides a logical zero output signal to the switching input 38 of the multiplexor 24, the decremented register output signal from the terminal 36 is provided as the multiplexor output signal on the terminal 37. The effect of this is to provide an envelope signal to the input terminal 39 of the register 40 which is forced to adopt the value of the rectified signal when the rectified signal is greater than or equal to the previous envelope signal, and to reasonably slowly decay toward zero otherwise. This signal thus provided can be described as an envelope signal in that it is comparable to, for example, the envelope detector of an am demodulator in its effect.

The subtracter 26 subtracts the register output signal received at the terminal 42, which corresponds to the value of the envelope signal provided by the multiplexor 24 on the preceding clock cycle, from an ideal or desired envelope value provided by an unshown control device on a second input terminal 44 of the subtracter 26. The result of this subtraction is to determine a difference value corresponding to the difference between the envelope value and a desired envelope value, thereby providing the gain error value a subtracter output terminal 45.

It will be appreciated that the terminal 42 of the subtracter 26 could be arranged to receive the multiplexor output signal, instead of the register output signal, to equal effect. Such connection may even provide increased performance.

Figure 3:
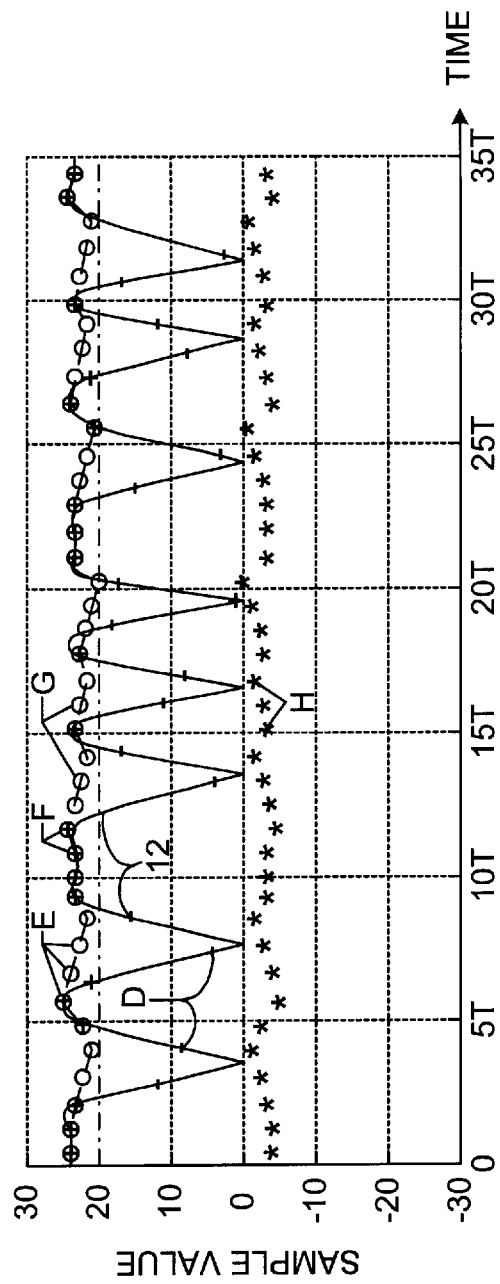
FIG. 3 shows gain error values provided by the part gain control arrangement of FIG. 2 in respect of a read signal.

FIG. 3 shows the effect of the above described gain error providing arrangement on the read signal 11 of FIG. 1. The signal 12 is the modulus of the signal 11, i.e. it is the rectified digital signal provided by the rectifying digital device 21 of FIG. 2. The sampling clock signal again has a period 13% smaller than the period T of the components of interest of the read signal 12. The unlocked nature of the clock signal results in the sampling of the signal 12 at the points D marked with crosses on the FIG. 3.

The FIG. 2 arrangement provides an envelope signal which has sample values at the sampling points marked as circles, E. Many of the envelope signal values E coincide with the read signal 12 samples D, in which case the comparator 22 of FIG. 2 determined that the rectified digital signal was of equal or greater value to the register output signal. Some of these values are marked as F. Others of the envelope signal values, such as those marked at G, do not coincide with the read signal 12, thus indicating when the comparator found the register output signal value to exceed the rectified signal value.

Gain error values H provided by the FIG. 2 arrangement range in value from minus four to zero, and are quite visibly more representative of the actual gain error than the gain error values C of FIG. 1. In use in an automatic gain control arrangement, the gain error values H are fed back to control the gain of an unshown amplifier preceding the ADC 29 of FIG. 2 in the read signal path.

The FIG. 2 automatic gain control arrangement thus provided is advantageous in that, because of the nature of the samples provided in respect of PR optical read channels, meaningful gain error values can be provided to control the gain of a read signal amplifier even before phase and frequency lock is obtained. This is of particular significance in partial response optical read channels having more than a few data slicer levels because incorrect slicing is so easily caused by incorrect gain and because even small percentages of incorrectly sliced samples with respect to correctly sliced ones can result in phase and frequency lock being difficult to attain.

I claim:

1. A gain control arrangement, for controlling the gain of a variable gain amplifier in dependence on the difference between the actual magnitude and the desired magnitude of a read signal provided over an optical data carrier read channel, comprising:

means to sample the amplitude of the read signal at periodic sampling points to provide a sample value for each sampling point;

means to determine an envelope value having regard to the sample value at a sampling point and an envelope value determined at a preceding sampling point; and means to determine a difference value corresponding to the difference between the envelope value a nd a desired envelope value, thereby providing a gain error value.

2. An arrangement in accordance with claim 1 in which the envelope value determining means comprises:

means to compare the sample value at a sampling point with an envelope value determined at a preceding sampling point; and means responsive to the comparison means to provide the larger of the compared values as the envelope value.

3. An arrangement in accordance with claim 2 further comprising means to subtract a predetermined value from the envelope value at a preceding sampling point to provide a decremented envelope value.

4. An arrangement in accordance with claim 3 further comprising means responsive when the comparison means shows the sample value to be lower than the envelope value at the preceding sampling point to provide the decremented envelope value as the envelope value.

5. An arrangement in accordance with claim 4 further comprising register means to provide the envelope value of a preceding sampling point from the envelope values and from a clock signal having a frequency equal to a frequency of the sampling points.

6. An arrangement in accordance with claim 5 in which the envelope determining means further comprises rectifying means to provide the modulus of the sample value to the compare means.

7. An automatic gain control arrangement in accordance with claim 1 in which the variable gain amplifier is controlled to amplify an input signal by an amount dependent on at least one gain error value to provide the read signal.

8. A method of controlling the gain of a variable gain amplifier in dependence on the difference between the actual magnitude and the desired magnitude of a read signal provided over an optical data carrier read channel, comprising the steps of:

sampling the amplitude of the read signal at periodic sampling points to provide a sample value for each sampling point;

determining an envelope value with regard to the sample value at a sampling point and an envelope value determined at a preceding sampling point; and determining a difference value corresponding to the difference between the envelope value and a desired envelope value, to thereby provide a gain error value.

9. A method in accordance with claim 8 in which the envelope value determining step comprises:

comparing the sample value at a sampling point with an envelope value determined at a preceding point; and providing the largest of the compared values as the envelope value.

10. A method in accordance with claim 9 further comprising the step of subtracting a predetermined value from the envelope value at a preceding sampling point to provide a decremented envelope value.

11. A method in accordance with claim 10 further comprising the step of providing, when the comparing step shows the sample value to be lower than the envelope value at the preceding sampling point, the decremented envelope value as the envelope value.

12. A method in accordance with claim 11 further comprising the step of delaying the envelope values by one clock period of a clock signal having a frequency equal to a frequency of the sampling points to provide the envelope value of a preceding sampling point.

13. A method in accordance with claim 12 in which the envelope determining step further comprises rectifying the sample value to provide the modulus thereof for use in the comparing step.

14. A method in accordance with claim 8 further comprising the step of controlling the gain of the variable gain amplifier to amplify an input signal by an amount dependent on at least one gain error value to provide the read signal.

* * * * *